A. H. HENDERSON.
TREATMENT OF RAWHIDE.
APPLICATION FILED APR. 6, 1911.
1,020,498.
Patented Mar. 19, 1912.
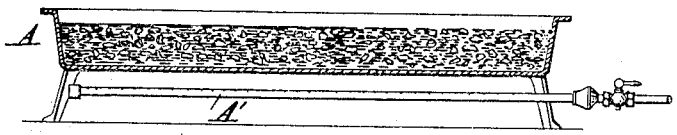
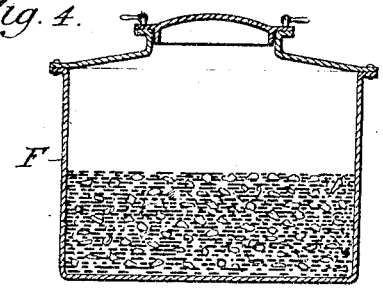
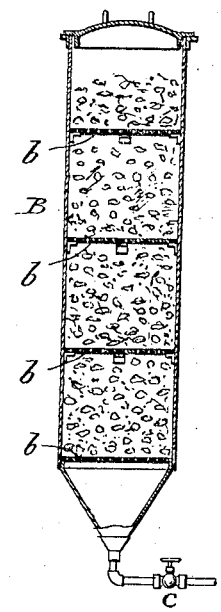
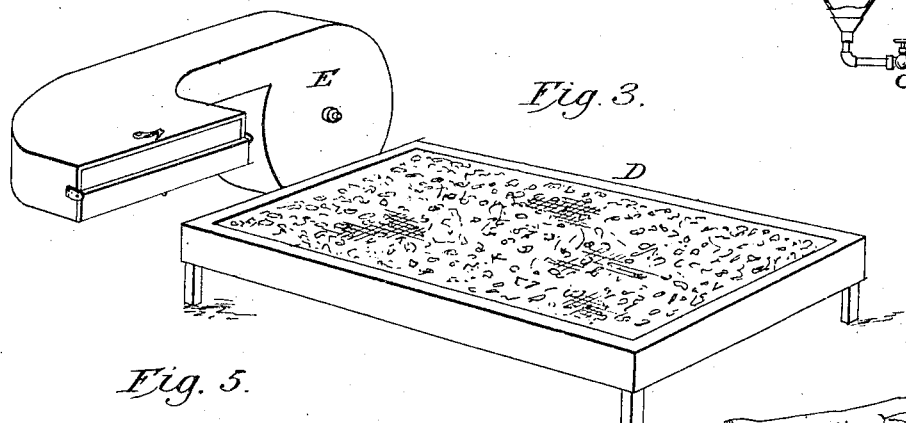
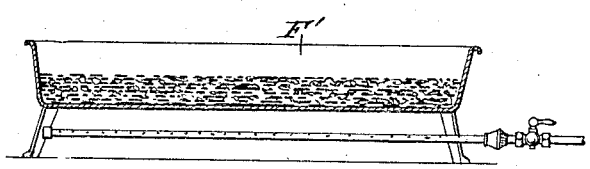
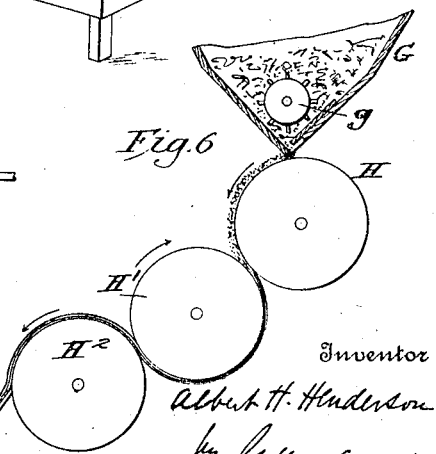

UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

TREATMENT OF RAWHIDE.

1,020,498.  Specification of Letters Patent.  Patented Mar. 19, 1912.

Application filed April 6, 1911. Serial No. 619,405.

*To all whom it may concern:*

Be it known that I, ALBERT H. HENDERSON, a citizen of the United States, residing at Baltimore, State of Maryland, have invented new and useful Improvements in Treatment of Rawhide, of which the following is a specification.

My invention relates, first, to treating rawhide in the form of disks or slugs, or in fragmentary or granulated condition, in such manner as to permanently expand the hide to considerably beyond its normal state and open its pores, and thereafter impregnating it with rubber whereby it is made permanently flexible or resilient. Heretofore, rawhide has been softened or swollen by a steaming or hot water treatment, but such practice has the disadvantage of introducing into the rawhide a certain amount of water which, penetrating to the interior of the substance and there remaining, prevents the subsequent introduction of oils or rubber solutions; and if the rawhide thus subjected to such softening and swelling treatment is afterward dried out, it resumes its original condition without any useful result having been accomplished. In the practice of this part of my invention this result is not found, for the agent employed for the swelling and the opening of the pores of the rawhide may be removed and the substance still left substantially in the form of a spongy mass and in ideal condition to absorb any solution of rubber or oily or other material which it is desired to add to the substance in order to give to it the characteristic of flexibility or resiliency.

Briefly considered, therefore, the first part of my invention consists in swelling the rawhide by means of an agent preferably miscible with either oil or water and which may be used either with or without heat; practically removing this swelling agent by means of a solvent, such as petroleum-benzin or coal tar naphtha; removing this solvent by suitable means, as by draining and evaporation assisted by a current of air, and lastly introducing into the spongy rawhide rubber in the form of a solution or that of a heated fluid.

The reason for the preferred use of a swelling agent which is miscible with both oil and water is as follows:—Where, for example, plain water is used for swelling rawhide it has been found difficult to expel the water and replace it with either oil or rubber solutions; whereas by using a swelling agent miscible with either oil or water such displacement is more readily made on account of the mutual solubilities. When rawhide is swollen in a liquid composed of say one half water and one half oil, and the water is removed by evaporation or heat, we have left one half of the swelling agent as oil which is soluble in many of the well known rubber solvents and which, it is obvious, will allow an interchange of solutions of rubber and oil. This therefore affords a practical method for the introduction of rubber into rawhide in a swollen state and at the same time one not too expensive. Efforts have been made to introduce rubber solutions into materials by various methods, but on account of the thick nature of the rubber solutions they have not proved successful.

My invention relates, secondly, to uniting, solidifying or bringing together separate particles of rawhide treated as above; and thirdly, in a vulcanizing action to which the treated and solidified material is subjected.

Various kinds of apparatus may be used in carrying out the several steps of my improved method, and in order to better describe such steps I show in the accompanying drawing simple means obviously not applicable for commercial use.

Figure 1 shows diagrammatically an oil bath applicable for use in the softening and swelling of the material; Fig. 2 a percolator with diaphragms; Fig. 3, a table or tray used for drying and evaporating purposes and also an air forcing means adapted to be used therewith; Fig. 4, means for using a cold liquid rubber solution; Fig. 5, means for employing in the treatment a hot rubber mass or bath; and Fig. 6, means for solidifying the mass to be subsequently vulcanized by any well known method.

The hide in the form of disks or slugs or in granulated form is thrown into a bath of suitable oil, preferably animal or vegetable, or its derivatives, and subjected to heat for a suitable length of time. Fig. 1 shows by A an oil bath adapted for use in this step of my method. The action of this bath upon the material is to cause the swelling thereof and the opening of its pores. The bath A will be heated in accordance with its size by any appropriate heating medium, A'.

Fig. 2 shows a percolator B of ordinary form with a series of perforated diaphragms b. The material after being removed from the bath A (the removal may be by any known mechanical means) is placed in the percolator B. By preference the diaphragms b are removable, the material being first placed at the bottom of the percolator, after which the diaphragms are successively stored with the material until the percolator is filled to its entire capacity. A volatile liquid solvent, as petroleum-benzin, coal tar naphtha or the like is now admitted to the upper part of the percolator and drains through the material placed upon the perforated diaphragms. The course of this liquid through the percolator is preferably uninterrupted, the valve or cock c at the base being open. It may be well, however, under certain conditions, to allow the material to be subjected for a long time to the liquid. It is also within my invention to use a percolator in which the action of the fluid is reversed with or without external pressure. The draining incident to the use of the percolator is followed by an action including the evaporation of the agent and the drying of the material.

Fig. 3 shows a foraminous tray or table D made of wire, perforated metal or otherwise. Material taken from the percolator is strewn over this table, and air under pressure, either cold or heated, is forced to the material either above or below the table or both by means of an ordinary blast motor E of any approved construction. At the end of this stage the material is permanently in the substantial form of a dry spongy substance, very open and still separated.

The disks, slugs or granules originally used are now enlarged or swollen to several times their original size and in fit condition for the saturation of the mass with a liquid rubber solution. This may be done by a cold process as seen in Fig. 4, in which a vessel F of such dimensions as are required is shown containing a cold liquid rubber solution in which the material taken from the table D is immersed. This cold rubber solution may be obtained in various ways known to chemical science. I preferably employ a soultion of ordinary unvulcanized rubber in benzol.

Fig. 5 shows a vessel or bath F' in which rubber or a rubber substitute may be fused in a known manner. The slugs or granules already treated are placed in this tank, and on applying heat thereto the rubber mass becomes fluid and permeates the whole body of each of the swollen parts.

Fig. 6 shows in diagrammatic form a mechanism for solidifying the separate particles of rawhide treated as above. Such particles are passed into a hopper G, which may have a revolving feeder g, and conveyed to a series of rollers H, H', H² which are set the proper distance apart to give the mass the required thickness or produce the proper solidifying action. From these rollers the material may pass to a table I. The rollers may have any kind of face as flat, corrugated or otherwise, so that the mass passed therethrough shall be given such shape as to impart to it the character of an articles of commerce.

As thus far described the rubber solution has not been subjected to any vulcanizing process, and it is my object to prevent the complete vulcanizing of a certain proportion of the rubber which is present in the interior confines of the spongy material. This is accomplished by employing the proper proportion of sulfur in any form, which is preferably placed in the hopper and passed down through the rollers with the rubber-impregnated particles of rawhide. The rolls shown in Fig. 6 may be cold or heated. If heated, the heating is effected in any known way forming no part of this invention. The sulfur thus mixed with the rubber-impregnated material is intended to be sufficient to enable the carrying out of the vulcanizing process as far as required in the known way. Each portion or body of the material when it leaves the last roll contains enough sulfur to admit of the individual vulcanization of that particular body, or to enable it to be united with other bodies so that the vulcanization process may be carried on as to all alike and at the same time. The bodies of material finally passed through the rollers are in such shape to be vulcanized and also molded into any form which may be desirable in the art, as for example, tires for automobiles, or any other article of commerce.

While in the foregoing the agent preferably employed in the swelling of the rawhide is broadly stated as miscible with either oil or water, I have found that ricin-oleic acid or any sulfoleic acid made from any suitable oil and known to commerce as turkey red oils, are effective for the purpose.

It is to be understood that wherever rubber is herein mentioned, and especially in the claims, I wish to include rubber substitutes or reclaimed rubbers as equivalents thereof. Among the rubber substitutes is an important and growing class of compounds, artificial in character, while others are natural products. Furthermore, with the rubber, however used, any of these substitutes or reclaimed rubbers, in smaller or larger quantities, may be employed.

Having thus described my invention, I claim:—

1. The herein described method which consists in swelling and expanding rawhide substantially to the character of a permanently spongy substance, practically removing the swelling agent and introducing rubber to the substance, substantially as set forth.

2. The herein described method which consists in swelling and expanding rawhide substantially to the character of a permanently spongy substance by subjecting it to an agent miscible with either oil or water, practically removing this agent by means of a solvent, removing the solvent, drying the substance, and introducing rubber thereto, substantially as set forth.

3. The herein described method which consists in swelling and expanding rawhide substantially to the character of a permanently spongy substance by subjecting it to a bath of oil, practically removing the oil by means of a solvent, removing the latter by draining and evaporation, and introducing into the spongy substance rubber in the form of a solution, substantially as set forth.

4. The herein described method which consists in swelling and expanding rawhide substantially to the character of a permanently spongy substance by subjecting it to a bath of oil, practically removing the oil by means of a solvent, removing the latter by draining and evaporation, and introducing into the spongy substance rubber in the form of a heated fluid, substantially as set forth.

5. The herein described method which consists in reducing rawhide to fragmentary form, introducing a swelling agent to the fragments whereby they are brought to a permanently spongy condition, practically removing the swelling agent, and introducing rubber to the swollen fragments, substantially as set forth.

6. The herein described method which consists in reducing rawhide to fragmentary form, introducing a swelling agent to the fragments whereby they are brought to a permanently spongy condition, practically removing the swelling agent, drying the fragments, and introducing rubber to the latter, substantially as set forth.

7. The herein described method which consists in reducing rawhide to fragmentary form, introducing a swelling agent to the fragments whereby they are brought to a permanently spongy condition, practically removing the swelling agent, drying the fragments, introducing rubber to the latter, and vulcanizing, substantially as set forth.

8. The herein described method which consists in reducing rawhide to fragmentary form, introducing a swelling agent to the fragments whereby they are brought to a permanently spongy condition, practically removing the swelling agent, introducing rubber to the fragments, and forming the fragments into a mass, substantially as set forth.

9. The herein described method which consists in reducing rawhide to fragmentary form, introducing a swelling agent to the fragments whereby they are brought to a permanently spongy condition, practically removing the swelling agent, introducing rubber to the fragments, forming the separate fragments into a mass, and vulcanizing, substantially as set forth.

10. The herein described method which consists in reducing rawhide to fragmentary form, introducing a swelling agent to the fragments whereby they are brought to a permanently spongy condition, practically removing the swelling agent, drying the fragments, introducing rubber to them, subjecting them to solidifying pressure whereby to form a combined mass, introducing a vulcanizing agent during the pressure, and finally completing the vulcanization, substantially as set forth.

In testimony whereof I affix my signature in presence of two witnesses.

ALBERT H. HENDERSON.

Witnesses:
P. W. JAMES,
RAYMOND M. GLAEKEN.